United States Patent
Sammatshetti

(10) Patent No.: US 9,998,558 B2
(45) Date of Patent: Jun. 12, 2018

(54) METHOD TO IMPLEMENT RDMA NVME DEVICE

(71) Applicant: Samsung Electronics Co., Ltd., Suwon-si, Gyeonggi-do (KR)

(72) Inventor: Sandeep Anandkumar Sammatshetti, Bangalore (IN)

(73) Assignee: Samsung Electronics Co., Ltd., Gyeonggi-do (KR)

(*) Notice: Subject to any disclaimer, the term of this patent is extended or adjusted under 35 U.S.C. 154(b) by 122 days.

(21) Appl. No.: 15/204,160

(22) Filed: Jul. 7, 2016

(65) Prior Publication Data

US 2017/0149920 A1    May 25, 2017

(30) Foreign Application Priority Data

Jul. 8, 2015    (IN) ............................ 3494/CHE/2015
Nov. 25, 2015  (IN) ............................ 3494/CHE/2015

(51) Int. Cl.
  *G06F 3/06*   (2006.01)
  *G06F 13/42*  (2006.01)
  (Continued)

(52) U.S. Cl.
  CPC .......... *H04L 67/2842* (2013.01); *G06F 3/067* (2013.01); *G06F 3/0611* (2013.01);
  (Continued)

(58) Field of Classification Search
  CPC .. G06F 13/28; G06F 13/4063; G06F 13/4282; G06F 13/00; G06F 13/4068; G06F 13/4221; G06F 13/161; G06F 2213/0026; G06F 3/0611; G06F 3/0632; G06F 3/0659; G06F 3/067; G06F 3/0688; G06F 3/061;
  (Continued)

(56) References Cited

U.S. PATENT DOCUMENTS 8,463,881 B1    6/2013  Baker et al.
8,554,968 B1   10/2013  Onufryk et al.
(Continued)

OTHER PUBLICATIONS

Carlson et al. "Introducing FC-NVMe: The Best of Both Worlds," FCIA, printed Feb. 2, 2018.*
(Continued)

*Primary Examiner* — Alina N Boutah
(74) *Attorney, Agent, or Firm* — Harness, Dickey & Pierce, P.L.C.

(57) ABSTRACT

Various example embodiments herein disclose methods of enabling access to a storage device remotely over the network. According to at least one example embodiment, a method comprising initializing a Non-Volatile Memory Express (NVMe) controller, by a network device coupled to a server, configuring, by the network device, a NVMe queue pair for handling a remote device discovery process, receiving, at the network device, a request from the remote device to access the storage device controlled by the NVMe controller maintained at the server, initiating, by the network device, the discovery process for locating the remote device; and establishing, by the network device, a connection with the remote device by mapping the NVMe queue pair with a Remote Direct Memory Access (RDMA) queue pair, once the remoted device is discovered.

17 Claims, 5 Drawing Sheets

(51) Int. Cl.
*H04L 29/08* (2006.01)
*G06F 13/40* (2006.01)
*G06F 13/28* (2006.01)

(52) U.S. Cl.
CPC .......... *G06F 3/0632* (2013.01); *G06F 3/0659* (2013.01); *G06F 13/28* (2013.01); *G06F 13/4063* (2013.01); *G06F 13/4282* (2013.01); *G06F 2213/0026* (2013.01)

(58) Field of Classification Search
CPC .... G06F 3/0679; G06F 3/0689; G06F 11/201; H04L 67/2842; H04L 67/1097; H04L 67/1004; H04L 12/4633; H04L 12/40176
See application file for complete search history.

(56) References Cited

U.S. PATENT DOCUMENTS

| | | | |
|---|---|---|---|
| 8,588,228 | B1 | 11/2013 | Onufryk et al. |
| 9,467,512 | B2* | 10/2016 | Tamir .................... G06F 15/167 |
| 2010/0281201 | A1* | 11/2010 | O'Brien .............. G06F 13/4027 710/308 |
| 2013/0198311 | A1* | 8/2013 | Tamir .................... G06F 15/167 709/212 |
| 2013/0198312 | A1 | 8/2013 | Tamir et al. |
| 2014/0310370 | A1* | 10/2014 | Hendel ............... H04L 67/1097 709/212 |
| 2014/0317336 | A1* | 10/2014 | Fitch .................... G06F 12/0246 711/103 |
| 2014/0337540 | A1* | 11/2014 | Johnson ................. G06F 13/14 710/5 |
| 2015/0012607 | A1* | 1/2015 | Cayton ............... H04L 67/1097 709/212 |
| 2015/0012735 | A1* | 1/2015 | Tamir .................... G06F 9/4416 713/2 |
| 2016/0162438 | A1* | 6/2016 | Hussain .................. H04L 43/04 709/212 |
| 2016/0306580 | A1* | 10/2016 | Pinto ..................... G06F 3/0631 |
| 2017/0052916 | A1* | 2/2017 | Kollu .................. G06F 13/4022 |
| 2017/0104820 | A1* | 4/2017 | Golander ............ H04L 67/1095 |
| 2017/0249281 | A1* | 8/2017 | Tamir ................ G06F 15/17331 |

OTHER PUBLICATIONS

Ayandeh, Siamack, "NVMe over Fabric Architecture & Functional Model," 15-327v1, HP Networking, Sep. 2015.*

* cited by examiner

METHOD TO IMPLEMENT RDMA NVME DEVICE

CROSS-REFERENCE TO RELATED APPLICATION

This U.S. non-provisional application claims the benefit of priority under 35 U.S.C. § 119(e) to Indian Provisional Patent Application No. 3494/CHE/2015 filed on Jul. 8, 2015 in the Indian Intellectual Property Office, and Indian Patent Application No. 3494/CHE/2015 filed on Nov. 25, 2015 in the Indian Intellectual Property Office, the entire contents of both of which are incorporated herein by reference.

FIELD

Various example embodiments generally relate to data storage over a computer network and more particularly to methods, systems, and/or apparatuses for integrating remote direct memory access (RDMA)-enabled network interface controllers (RNIC) and Non-Volatile Memory Express (NVMe) devices at the controller/device side.

BACKGROUND

In a conventional computing arrangement, a client and a server include respective network interface controllers (NICs) or network (NW) input/output (I/O) devices that are capable of communicating with each other using a Remote Direct Memory Access (RDMA) protocol. The server includes a host processor that executes the server's operating system and associated drivers. The server may also include a storage controller that directly manages access to data storage devices maintained at or by the server. The client's NW I/O device issues requests to the server's NW I/O device to write data to and read data from the storage devices maintained by the server. The server's operating system, associated drivers, and host processor process the requests received by the server's NW I/O device, and issues corresponding requests to the storage controller. The storage controller receives and executes these corresponding requests. After executing the corresponding requests, the storage controller issues request completion information (and associated data if data has been read from the storage) to the server's operating system and associated drivers. From this, the server's operating system, associated drivers, and host processor generate corresponding request completion information and associated data, and issue the corresponding request completion information and associated data to the server's NW I/O device. The server's NW I/O device then issues the corresponding request completion information and associated data to the client's NW I/O device.

The Non-Volatile Memory Express (NVMe) forum is currently standardizing the NVMe fabrics specification directed towards different transport methods for the NVMe protocol. The forum is aiming on providing low latency data transfer over computer networks using Remote DMA with NVMe. With the increase in need for faster data storage over computer networks, the usage of low latency NVMe based solid-state drives (SSD) using RDMA is highly anticipated.

According to the current art, memory is managed separately when commands and data are copied from RNIC memory to the NVMe memory and vice versa. Each of the memory modules register their own interrupts and there is a redundant usage of host resources. The problems faced by the current method include incompatible interfaces, increased redundancy, the requirement of conversion modules increases cost, inefficient memory usage, and the requirement of multiple interrupt handlers.

In view of the foregoing, there is a need for a method, system, and/or apparatuses for handling data over a network for seamless data transfer between the initiator device and the controller/device.

The above mentioned shortcomings, disadvantages and problems are addressed herein and which will be understood by reading and studying the following specification and the various example embodiments described herein.

SUMMARY

The various example embodiments of the present inventive concepts disclose a method to implement a Remote Direct Memory Access (RDMA) Non-Volatile Memory Express (NVMe) device. According to various example embodiments of the present inventive concepts, a NVMe solid-state drive (SSD) is implemented which employs RDMA to support block device data storage over a network. According to at least one example embodiment of the present inventive concepts a user may access the device remotely over the network and perform all disk operations like it is connected locally to a machine.

According to at least one example embodiment of the present inventive concepts, a method of enabling access to a storage device remotely over a network is disclosed. The method comprises initializing a Non-Volatile Memory Express (NVMe) controller by a network device coupled to a server, the network device including the NVMe controller, and the NVMe controller configured to control at least one storage device connected to the network device, configuring, using the network device, an NVMe queue pair for handling a remote device discovery process, receiving, using the network device, a request from the remote device to access the storage device, initiating, using the network device, the discovery process for locating the remote device, and establishing, using the network device, a connection with the remote device by mapping the NVMe queue pair with a Remote Direct Memory Access (RDMA) queue pair, once the remote device is discovered.

According to at least one example embodiment of the present inventive concepts, a system is disclosed for providing access to a storage device remotely over a network. The system comprises a network device coupled to a server, the network device including a Non-Volatile Memory Express (NVMe) controller and configured to, configure a NVMe queue pair for handling a remote device discovery process, receive a request from a remote device to access the storage device controlled by the NVMe controller, initiate the discovery process for locating the remote device, and establish a connection with the remote device by mapping the NVMe queue pair with a Remote Direct Memory Access (RDMA) queue pair, once the remote device is discovered.

According to at least one example embodiment of the present inventive concepts, a method for enabling access to a storage device remotely over a network is disclosed. The method includes initializing, using at least one processor associated with a Non-Volatile Memory Express (NVMe) controller associated with a network device, a Remote Direct Memory Access (RDMA) Network interface Card (RNIC), the initialization including configuring the RNIC as a server, generating, using the at least one processor, a master queue pair for handling a network discovery process, receiving, using the at least one processor, an incoming connection request from at least one remote device over a network, the incoming connection request being a request to connect to a storage device associated with the NVMe controller, connecting, using the at least one processor, the network device and the remote device through binding, receiving, using the at least one processor, incoming data operations from the remote device for the storage device, and processing, using the at least one processor, the received data operations on the storage device.

The foregoing has outlined, in general, the various aspects of the inventive concepts and is to serve as an aid to better understanding the more complete detailed description which is to follow. In reference to such, there is to be a clear understanding that the present inventive concepts are not limited to the method or application of use described and illustrated herein. It is intended that any other advantages and objects of the present inventive concepts that become apparent or obvious from the detailed description or illustrations contained herein are within the scope of the present inventive concepts.

BRIEF DESCRIPTION OF THE DRAWINGS

The foregoing and other features of inventive concepts will be apparent from the more particular description of non-limiting example embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings.

Although specific features of the present inventive concepts are shown in some drawings and not in others, this is done for convenience only as each feature may be combined with any or all of the other features in accordance with the present inventive concepts.

DETAILED DESCRIPTION

The various example embodiments of the present inventive concepts disclose methods, systems, and/or apparatuses to implement a Remote Direct Memory Access (RDMA) Non-Volatile Memory Express (NVMe) device. In the following detailed description of some example embodiments of the inventive concepts, reference is made to the accompanying drawings that form a part hereof, and in which are shown by way of illustration specific example embodiments in which the inventive concepts may be practiced. These example embodiments are described in sufficient detail to enable those skilled in the art to practice the inventive concepts, and it is to be understood that other example embodiments may be utilized and that changes may be made without departing from the scope of the present inventive concepts. The following detailed description is, therefore, not to be taken in a limiting sense, and the scope of the present inventive concepts is defined only by the appended claims.

The specification may refer to "an", "one" or "some" example embodiment(s) in several locations. This does not necessarily imply that each such reference is to the same example embodiment(s), or that the feature only applies to a single embodiment. Single features of different example embodiments may also be combined to provide other example embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
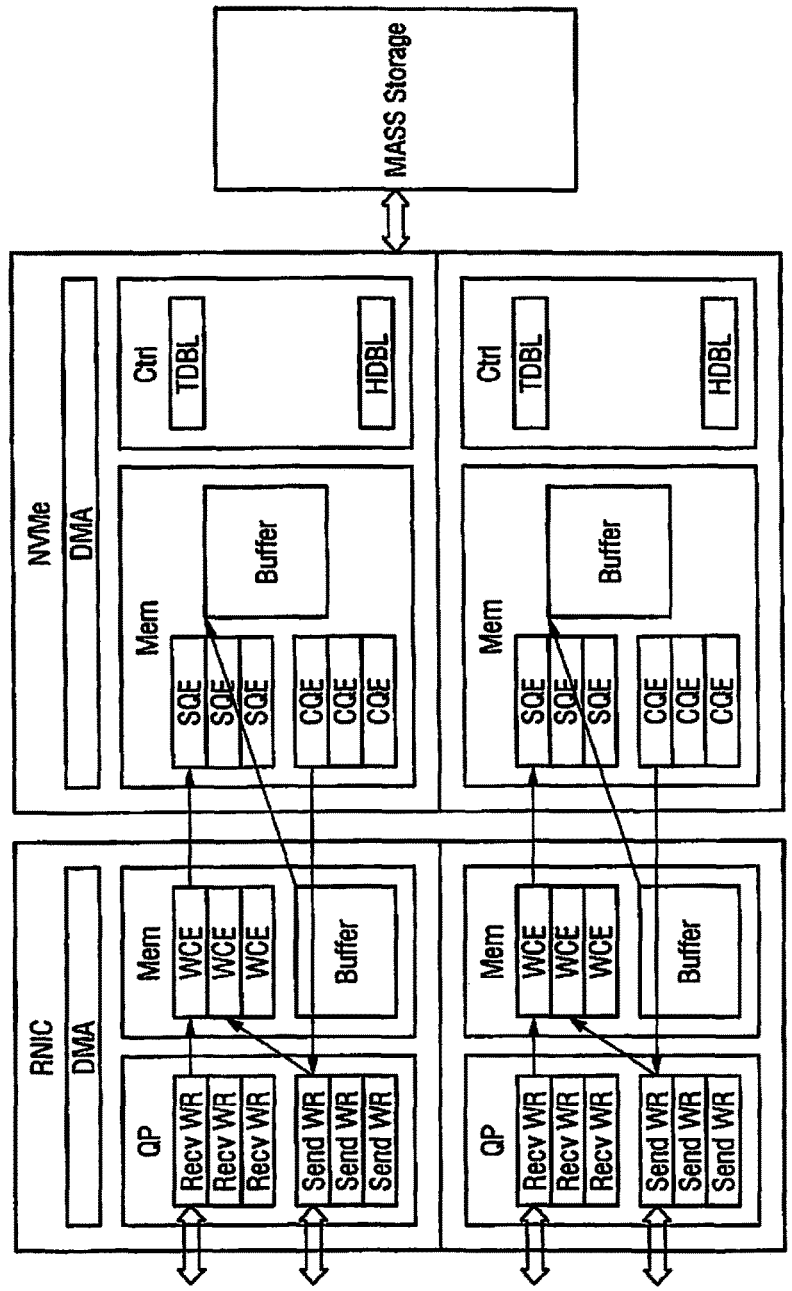
FIG. 1 is a schematic representation illustrating an interface mechanism, according to the prior art.

FIG. 1 is a schematic representation illustrating an interface mechanism according to the prior art. The remote direct memory access (RDMA)-enabled network interface controller (RNIC) will include a plurality of Queue Pairs (QP) for establishing communications with a client computing device. Each of the QPs include at least a Receive Work Request (REC WR) queue and Send Work Request (Send WR) queue for handling the data associated with the Work Requests. System memory associated with the RNIC is required to manage the QPs to contain information about different Work Requests and also to handle the associated data. Hence the memory is allocated for data and also for the events generated by one or more QP Work Completion Entries (WCE).

The NVMe subsystem stores relevant event entries and includes a buffer to handle data and work requests. The NVMe subsystem also requires its own separate memory that stores Send Queue Entries (SQE) and Completion Queue Entries (CQE) to manage the events from the storage device and/or the RNIC. The Tail Door Bell pointer(s) (TDBL) and Head Door Bell pointer(s) (HDBL) of the controller are set or read depending on the receive requests and/or send requests received by the NVMe subsystem.

Figure 2:
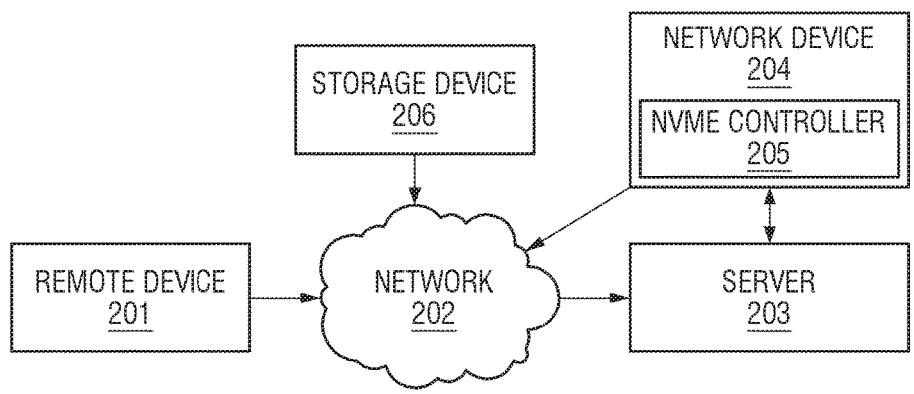
FIG. 2 is a block diagram illustrating system for providing access for remote device data storage over network, according to at least one example embodiment of the present inventive concepts.

FIG. 2 is a block diagram illustrating an NVMe SSD which employs RDMA to support remote device data storage over a network, according to at least one example embodiment of the present inventive concepts. The system comprises a remote device 201, a network 202, a server 203, a network device 204, an NVMe controller 205, and a storage device 206. The network device 204 and NVMe controller 205 may be coupled and/or connected to the server 203 and the storage device 206 over a network, such as network 202, but is not limited thereto. According to other example embodiments of the present inventive concepts, the storage device 206 may be physically (e.g., directly) connected to the server 203 and/or network device 204.

The network 204 can be any network capable of transporting data between the remote device 201, server 203, network device 204 and the storage device 206. In general, data can take the form of, but is not limited to, images, video, music, documents, files, etc. The network 204 can be private or public, wired or wireless, in whole or in part.

The server 203 can be any computer system, processing apparatus, or equivalent that provides services to other computing systems, processing apparatuses, etc., over a network, such as network 204. Generally, the server 203 manages, processes, and/or validates information and/or data. In at least one example embodiment of the inventive concepts, the server 203 provides identification services to devices (e.g., remote device 201, etc.) connected to the network 202. Examples of the devices connecting to the network 202 may include, a personal computer (PC), a laptop, a tablet, a smartphone, a smart television (TV), a personal digital assistant (PDA), a media player, a personal navigation device, a global positioning system (GPS) device, an electronic book terminal, a digital camera, a wearable device, a gaming console, a Virtual Reality (VR) display device, an Internet of Things (IoT) device, and other mobile or non-mobile computing apparatuses capable of connecting to a network According to at least one example embodiment of the inventive concepts, the server 203 validates credentials sent by one or more devices, such as remote device 201, to the network 202 with credentials sent by another device, such as storage device 206, coupled to the network 202. In some example embodiments of the present inventive concepts, the server 203 stores data and manages access to the stored data over the network 202 and the remote device 201 creates remote access information to transfer to the network device 204 over the network 202.

According to at least one example embodiment of the present inventive concepts, the storage device 206 comprises at least one of a hard disk drive (HDD), a solid state drive (SSD), a SSD having non-volatile memory comprising at least one of a 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM), etc. The storage device 206 connected to the network device 204 is implemented using the NVMe storage protocol using Remote Direct Memory Access (RDMA). Here the NVME storage protocol comprises one of Internet Wide Area RDMA protocol (iWARP), Infiniband or RDMA over Converged Ethernet (RoCE), etc. However, the example embodiments are not limited thereto, and other network protocols may be used instead.

Figure 3:
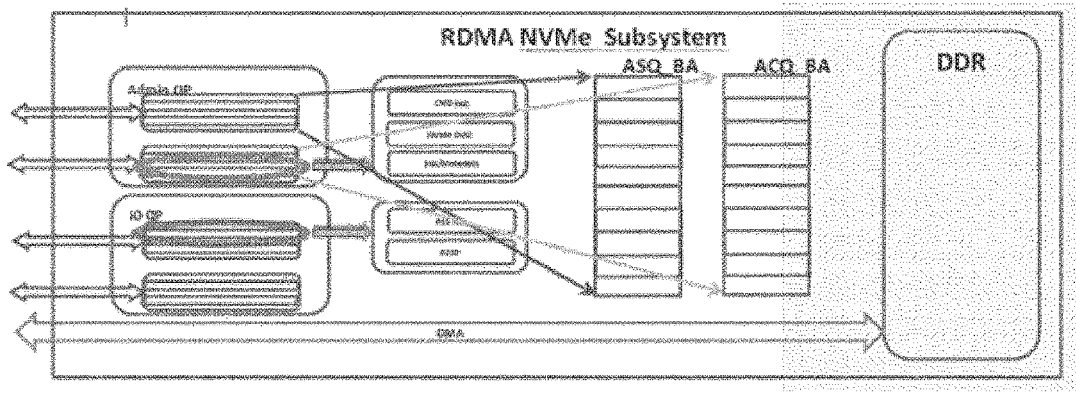
FIG. 3 is a block diagram of a RDMA NVMe subsystem, according to at least one example embodiment of the present inventive concepts.

FIG. 3 is a block diagram of a RDMA NVMe subsystem, according to at least one example embodiment of the present inventive concepts. The RDMA NVMe subsystem interfaces include the building blocks for efficient integration of RDMA and NVMe controllers according to at least one example embodiment are described herein. At least one RDMA Queue Pair (QP) will be registered as NVMe queues. The NVMe uses the same or similar Direct Memory Access (DMA) operations, requests, and/or commands which are used by a RDMA-enabled network interface controller (RNIC) and can place (e.g., access, read, write, delete, modify, etc.) data that has been stored on a storage device physically located on a separate device directly over a network. The internal RAM (e.g., DDR memory, etc.) is registered with the RDMA as Non-Shared Memory Region (NSMR) and the internal RAM is used for handling RDMA_SEND requests which include NVMe commands, and posting responses using RDMA_SEND. Also, the internal RAM is registered with the RDMA for direct data placement used for RDMA_WRITE operations and RDMA_READ_RES operations. The data from the initiator is directly placed into the Random Access Memory (RAM) of the firmware (F/W) to process according to the respective command.

The RDMA NVMe subsystem supports multiple Queue Pairs (QP) for communications with one or more client computing devices. An Admin QP is created and is provided for the initial identification and device management commands. For different input/output (IO) operations, a computing device can accommodate multiple IO QP as created by the host using the Admin QP for read and/or write operations. With respect to each QP, either the Admin QP or any 10 QP, the NVMe subsystem will use a Send Queue (SQ) and Completion Queue (CQ) to communicate with the storage media. With regard to the Admin QP, there is an Admin Send Queue (ASQ) and an Admin Completion Queue (ACQ). The base addresses of each of these queues are referred to as ASQ_BA and ACQ_BA, respectively.

The RDMA NVMe subsystem also includes internal memory, such as Double Data Rate Random Access Memory (DDR RAM), etc. Data is directly accessed, read, and/or written into the channel by RNIC using Direct Memory Access (DMA).

Figure 4:
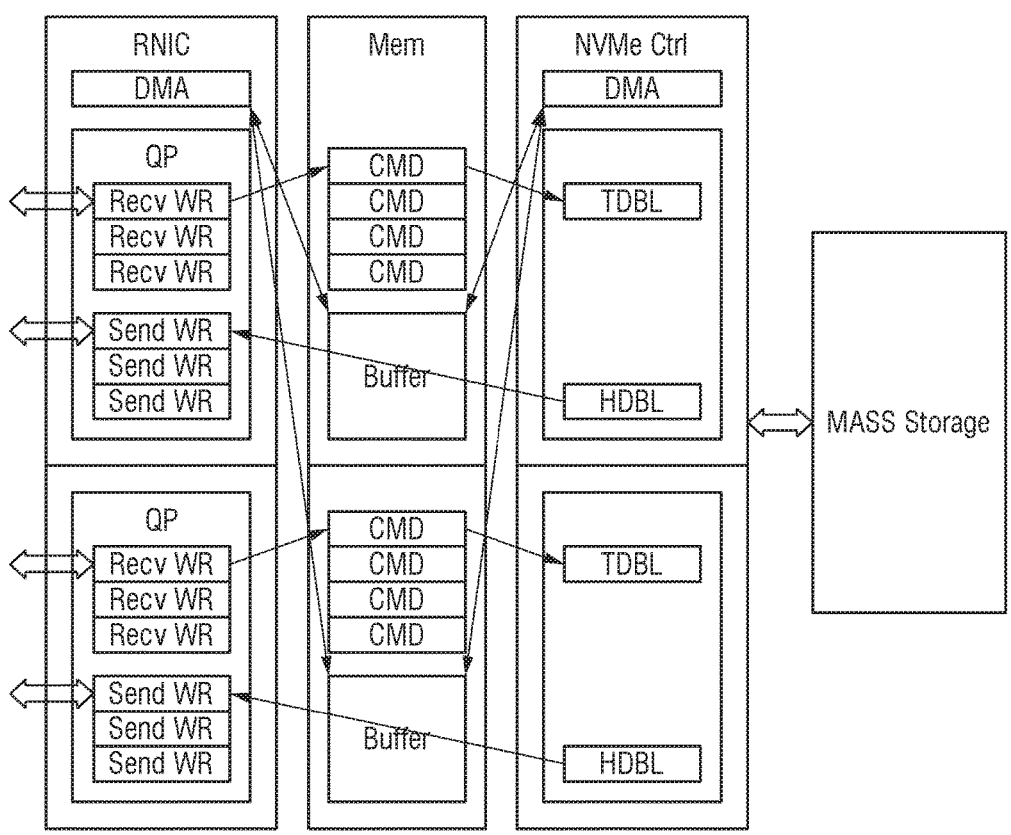
FIG. 4 is a block diagram illustrating interfacing of an RDMA NVMe device, according to at least one example embodiment of the present inventive concepts.

FIG. 4 is a block diagram illustrating the interfacing of an RDMA NVMe device, according to at least one example embodiment of the present inventive concepts. The process involved in the mechanism which covers the sequences from connection establishment between one or more remote devices and one or more network devices for the handling of one full Read and Write transaction is as follows. Once the network device is powered on, the NVMe controller initialization process takes place which comprises the booting up of at least one processor (not shown) associated with the NVMe controller (e.g., the at least one processor installed on the NVMe controller board) and invoking firmware for the NVMe controller, initializing, by the firmware, all of the modules including Special Function Registers (SFRs), memory units, etc., and lastly, the RNIC initialization. Upon initialization, the RNIC configures itself as a server. Further, the at least one network device by default configures (e.g., creates and/or generates) a master queue pair for handling the network discovery process. Upon configuring the master queue pair, the at least one network device listens for incoming connection requests from any remote devices.

Further, the network device initiates the discovery process for locating the at least one remote device. Once the remote device(s) is discovered, the network device binds itself with the remote device and the connection is established. The connection establishment indicates that the master queue pairs at both the remote device end and the network device end are configured. The master queue pair is mapped with the admin queue for the NVMe subsystem and the master queue pair at the network device has the attributes where the Admin commands are requested by the network device using the master queue pair and a default NSMR is registered exclusively for the master queue pair.

Still further, the network device creates a NVMe identify command and then posts a RDMA_SEND operation. The received NVMe identify command will be decoded, (e.g., processed) by by the NVMe controller. The NVMe identify command is fetched along with a reference to a queue pair receive completion event. Upon fetching the NVMe identify command, the command is read by the NVMe controller through the use of the queue tail pointer, which is always in sync with queue pair completion event. The completion event triggers the firmware in a similar manner as a doorbell ring operation. For data movement, data is directly DMAed (in other words, the data is directly transferred using the DMA data protocol) into the RDMA Scatter/Gather Lists (SGLs) which are registered for a particular operation.

According to at least one example embodiment of the present inventive concepts, the command capsule also contains the Physical Region Page (PRP) field which is a host registered shared memory region. The identify data will then be directly read from the firmware and DMAed into the RDMA SGL which is to be sent to the network device. The above steps are the same or similar for any command which performs data transfer from the remote device to the network device using the RDMA protocol, such as a flush, a write, a read, a write uncorrectable, a compare, etc., instruction. In the case of data transfer from the remote device to the storage device, the respective write command is decoded by the NVMe controller. The firmware will register the address where it wants to store the data with RDMA. Further, the SGL will be formed using a respective command with the registered address and sent to the network device. Upon receiving the response, the network device will form a data packet and addressing the data packet to the requested SGL and post the data packet. Once the respective RDMA packet is received, the RNIC will directly transfer the data into the firmware's buffer. The firmware will be notified once the receive completion event is triggered by the RNIC.

Figure 5:
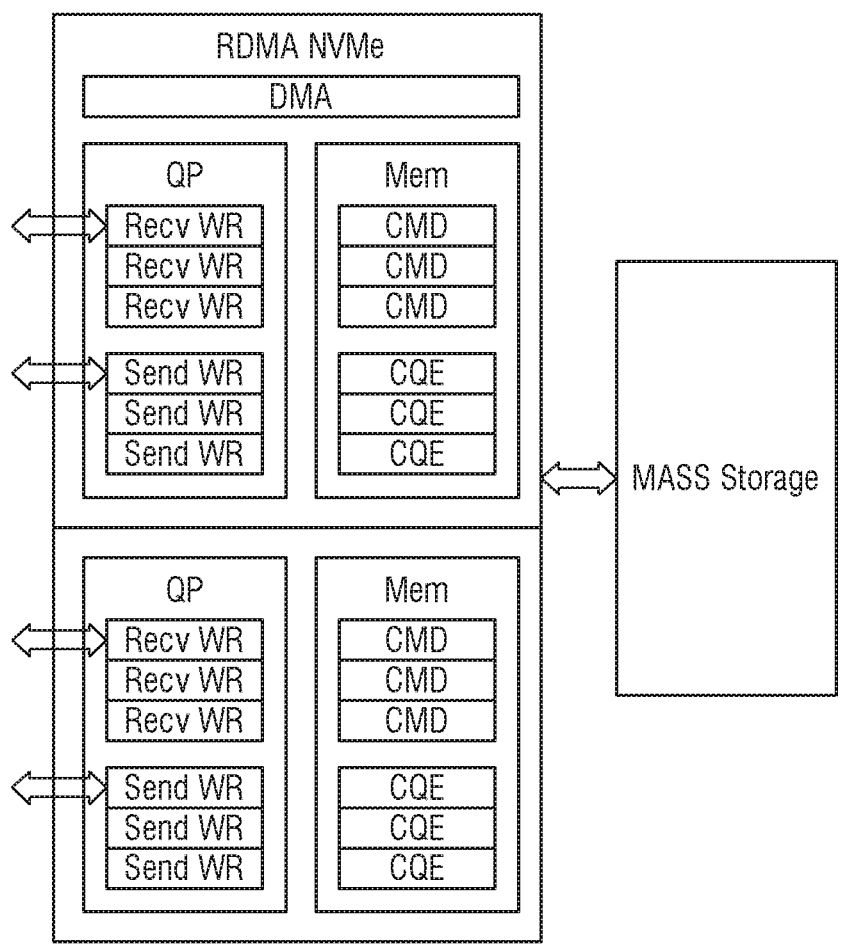
FIG. 5 is a block diagram illustrating interfacing of an RDMA NVMe device, according to at least one example embodiment of the present inventive concepts.

FIG. 5 is a block diagram illustrating the interfacing of an RDMA NVMe device, according to at least one example embodiment of the present inventive concepts. According to this example embodiment, a storage device is connected over a network that is implemented with the NVMe storage protocol using RDMA. The network protocols may include iWARP, infiniband, RoCE etc. Further, the NVMe queues are mapped with the RDMA queue pair, the admin submission queue base address and completion queue base addresses are mapped with the RDMA admin queue pair. A similar procedure is followed for multiple IO queues as well. The completion event for any queue pair initiates the NVMe controller and causes processing of the requested operation. No Tail doorbell update is required. The data movement from the controller and host will happen through memory registered with the RDMA as different memory regions.

According to at least one example embodiment of the inventive concepts, the standard interfaces provided by the Peripheral Component Interconnect Express (PCIe) based NVMe controller may be modified in order to be interfaced with the RNIC more efficiently.

According to at least one example embodiment of the present inventive concepts, existing PCIe based RNIC and NVMe devices are coupled together, thereby utilizing less memory by mapping the queue pairs and registering same memory for both sets of drivers. The interrupts registered for both the network device and the remote device are reduced by utilizing RNIC interrupts to invoke NVMe controller operation and vice versa.

Figure 6:
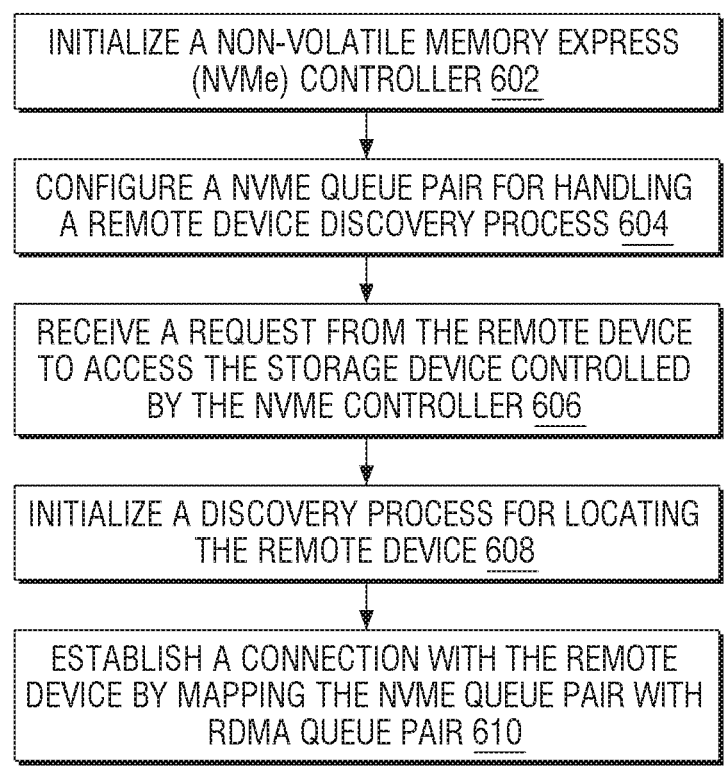
FIG. 6 is a flowchart illustrating a method of enabling access to a storage device remotely over the network using an RDMA NVMe device, according to at least one example embodiment of the present inventive concepts.

FIG. 6 is a flowchart illustrating a method of enabling access to a storage device remotely over the network using an RDMA NVMe device, according to at least one example embodiment of the present inventive concepts. At step 602, a Non-Volatile Memory Express (NVMe) controller is initialized by a network device, for example a network device coupled to a server. At step 604, the network device configures an NVMe queue pair for handling a remote device discovery process. At step 606, the network device receives a request from the remote device to access the storage device controlled by the NVMe controller maintained at the server. At step 608, the network device initiates a discovery process for locating the remote device. At step 610, the network device establishes a connection with the remote device by mapping the NVMe queue pair with a Remote Direct Memory Access (RDMA) queue pair, once the remoted device is discovered.

The example embodiments as disclosed by the present inventive concepts provides the low latency NVMe operations combined with the speed of RDMA operations to provide faster network storage solutions, as well as providing standalone SSD storage devices which have network capability, portability and scalability.

The present example embodiments have been described with reference to specific example embodiments; it will be evident that various modifications and changes may be made to these example embodiments without departing from the broader spirit and scope of the various example embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a non-transitory computer and/or machine readable media. For example, the various electrical structure and methods may be embodied using transistors, logic gates, and electrical circuits, such as application specific integrated circuit.

The units and/or modules described herein may be implemented using hardware components and/or a combination of hardware and software components. For example, the hardware components may include microcontrollers, memory modules, and processing devices, or the like. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors, multi-core processors, distributed processing, or the like.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments.

While some example embodiments have been particularly shown and described, it will be understood by one of ordinary skill in the art that variations in form and detail may be made therein without departing from the spirit and scope of the claims.

What is claimed is:

1. A method of enabling access to a storage device remotely over a network, the method comprising:
    initializing a Non-Volatile Memory Express (NVMe) controller by a network device coupled to a server, the network device including the NVMe controller, and the NVMe controller configured to control at least one storage device connected to the network device;
    configuring, using the network device, an NVMe queue pair for handling a remote device discovery process;
    receiving, using the network device, a request from the remote device to access the storage device;
    initiating, using the network device, the discovery process for locating the remote device; and
    establishing, using the network device, a connection with the remote device by mapping the NVMe queue pair with a Remote Direct Memory Access (RDMA) queue pair, once the remote device is discovered.

2. The method of claim 1, wherein establishing the connection with the remote device comprises:
    mapping the NVMe queue pair associated with the network device with the RDMA queue pair associated with the remote device; and
    mapping an admin submission queue base address and completion queue base address with a RDMA admin queue pair.

3. The method of claim 1, further comprising:
    transmitting, using the remote device, an NVMe command to the network device;
    fetching, by the NVMe controller, the NVMe command, the NVMe command comprising a reference to a queue pair receive completion event;
    decoding the NVMe command using the NVMe controller; and
    triggering the queue pair completion event using the NVMe controller.

4. The method of claim 3, wherein the NVMe command comprises at least one of a flush, a write, a read, a write uncorrectable, and a compare instruction.

5. The method of claim 3, wherein the NVMe command further comprises a Physical Region Page (PRP) field, the PRP field comprising a data identity which is to be sent to the network device.

6. The method of claim 1, wherein the initializing the controller comprises:
    booting up at least one processor;
    invoking firmware;
    initializing, using the firmware, one or more system modules comprising Special Function Registers (SFRs), and memory units; and
    initializing a RDMA Network interface Card (RNIC).

7. The method of claim 1, wherein the storage device connected to the network device is configured to use a NVMe storage protocol and Remote Direct Memory Access (RDMA).

8. The method of claim 7, wherein the NVME storage protocol comprises at least one of: Internet Wide Area RDMA protocol (iWARP), Infiniband, and RDMA over Converged Ethernet (RoCE).

9. The method of claim 1, wherein
    the initializing the controller includes initializing a RDMA Network interface Card (RNIC);
    the RNIC is a Peripheral Component Interconnect Express (PCIe) based RNIC; and
    the network device and the remote device are coupled together by mapping the queue pairs of the network device and the remote device and registering memory for use with both the network device and the remote device.

10. The method of claim 1, further comprising:
    indicating a status of an NVMe command in a completion indication field transmitted to the remote device, the completion indication indicating that the received request to access the storage device has been executed by the NVMe controller.

11. The method of claim 1, wherein the at least one storage device comprises at least one of a hard disk drive (HDD) and a solid state drive (SSD), the SSD having non-volatile memory comprising at least one of a 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire, and electrically erasable programmable read-only memory (EEPROM).

12. A system for providing access to a storage device remotely over a network, the system comprising:
    a network device coupled to a server, the network device including a Non-Volatile Memory Express (NVMe) controller and configured to
        configure a NVMe queue pair for handling a remote device discovery process,
        receive a request from a remote device to access the storage device controlled by the NVMe controller,
        initiate the discovery process for locating the remote device, and
        establish a connection with the remote device by mapping the NVMe queue pair with a Remote Direct Memory Access (RDMA) queue pair, once the remote device is discovered.

13. The system of claim 12, wherein the controller is configured to:
    boot up at least one processor;
    invoke firmware;
    initialize, using the firmware, one or more system modules comprising Special Function Registers (SFRs), and memory units; and
    initialize a RDMA Network interface Card (RNIC).

14. A method enabling access to a storage device remotely over a network comprising:
    initializing, using at least one processor associated with a Non-Volatile Memory Express (NVMe) controller associated with a network device, a Remote Direct Memory Access (RDMA) Network interface Card (RNIC), the initialization including configuring the RNIC as a server;
    generating, using the at least one processor, a master queue pair for handling a network discovery process;
    receiving, using the at least one processor, an incoming connection request from at least one remote device over a network, the incoming connection request being a request to connect to a storage device associated with the NVMe controller;
    connecting, using the at least one processor, the network device and the remote device through binding;
    receiving, using the at least one processor, incoming data operations from the remote device for the storage device; and processing, using the at least one processor, the received data operations on the storage device.

15. The method of claim 14, wherein the binding includes configuring the master queue pair of the NVMe controller and a master queue pair of the remote device by mapping both master queue pairs to an admin queue associated with the NVMe controller.

16. The method of claim 15, wherein the receiving incoming data operations from the remote device includes receiving admin commands addressed to the admin queue from the network device.

17. The method of claim 14, wherein the processing the received data operations includes:
- decoding, using the at least one processor, a received NVMe command from the received data operations;
- fetching, using the at least one processor, a reference to a queue pair receive completion event; and
- transferring, using the at least one processor, data associated with the received data operations using a Direct Memory Access (DMA) data transfer protocol.

* * * * *